Patented July 27, 1937

2,088,479

UNITED STATES PATENT OFFICE 2,088,479

METHOD OF MAKING A GUM DEFLOCCU-
LANT FROM GUM KARAYA AND LIKE FOR
PAPER-FIBER AND THE PRODUCT

Thomas R. Le Compte, Pittsburgh, Pa., assignor
to John A. Manning Paper Company, Inc.,
Green Island, N. Y., a corporation of New York No Drawing. Application March 7, 1934,
Serial No. 714,456

21 Claims. (Cl. 87—2)

My invention relates to the art of paper-making, and has for its chief objective utility the deflocculation, or maintenance of uniform distribution of paper-making fibers, which fibers, by reason of their length or other physical characteristics, tend to form clusters or flocks which impair formation in the paper web. Deflocculation of fibers suspended in water is of value in the manufacture of paper, since it promotes good formation in the paper web on the web-forming instrumentality, as for instance a Fourdrinier wire. The means for effecting deflocculation by conserving the distribution of water-suspended paper making fibers consists in a new hydrophile colloidal material, and my invention is exemplified by, or consists of, this new material, and the process by which it is made. In my researches for paper-fiber deflocculating or dispersing agents I investigated the deflocculating potency of sundry hydrophile colloids which, by reason of their faculty for forming uniformly distributed dispersions in water, offered a reasonable prospect that they might serve as effective defloculants for such fibers.

In sundry observed cases, a hydrophile colloid, dispersing itself in a body of water, tends to maintain dispersion of particles of matter suspended in the water, whether these particles be of colloidal dimension or larger, provided they be sufficiently small and of such specific gravity as to remain in dispersed suspension, under the conditions imposed. Fibers, however, especially if of considerable length in relation to their thickness, are difficult to separate from engagement or entanglement with each other, and do not respond to the dispersing effect of colloid material as readily as particles of which the major and minor dimensions are more nearly of the same order of magnitude.

I have been informed that some plants secrete as a normal content of their structure, hydrophile mucilaginous materials analogous to gums, which, dispersed in water manifest sufficient coherence to overcome the tendency of fibers also dispersed in the water to flocculate; the sources from which such materials are obtainable are, however, such that their employment on a commercial scale, as in the mill manufacture of paper in the United States of America would be economically impracticable. The object of my investigations, which led to the invention or discovery which will presently be stated and explained by specific example, has been to derive, from a material or materials obtainable in fairly large quantities and at moderate cost, a water dispersible gum-like material having the same order of coherence as the relatively rare and expensive natural secretions alluded to above. I resorted, therefore, to those gums which are well known and fairly abundant products on the market, and, recognizing the fact that such gums are not natural or normal plant-secretions but are pathological products, appearing as exudations where the plant has been wounded or infected, tentatively conceived the idea that a gum of the pathological product class might be so altered in its constitution as to manifest the deflocculating potency observed in some gum-like materials of the normal plant-secretion class. Having in mind practical economic desiderata, I examined gum karaya, which is probably the most abundant and the least expensive gum of the water-insoluble, water-imbibing type on the market. Gum karaya is gathered from the plant *Cochlospermum gossypium* and other related species, in northern India and elsewhere, and is characterized by a large molecule, of polyose structure, which can be resolved by hydrolysis into its ultimate relatively simple chain molecules, such as the pentoses, hexoses and uronic acids. These simple chain molecules are combined together to form a complex carbohydrate-like acid known as alpha-cochlosperminic acid. This acid combines with four acetyl groups to form tetra-acetyl cochlosperminic acid. A large number of these tetra-acetyl cochlosperminic acid groups condense together to form the gum karaya molecule. (Journal of the Chemical Society; Transactions, vol. 89, pt. 2, pp. 1495 to 1505,—1906.)

The natural plant-sources from which commercial gum karaya is gathered are rather miscellaneous, but are doubtless quite highly acetylated gum-acids, which respond to the process herein to be described in practically the same manner as the gum gathered from *Cochlospermum gossypium*. Such poly-acetylated polyose gums are hereinafter referred to as karaya.

Gum karaya gives physical evidence that its molecular weight is very high, and its molecule very large. Though insoluble in water, it imbibes water and forms a jelly therewith. Two per cent. of the gum in water forms a quite solid jelly, this jelly, however, manifests little coherence; it breaks "short", and dispersions of low concentration shown no, or feeble dispersing potency in relation to particles suspended in water.

On treating a gum karaya dispersion in water with a mild alkali (preferably ammonia) the gum is hydrolyzed, but only to the extent of replacing all or part of the acetyl radicals constituent in it. Deacetylation of gum karaya produces a derivative thereof which is a water-dispersible gum (not water-soluble, as evidenced by its resistance to filtration, which is practically the same as that of karaya jelly) having the property of coherence in high degree, and having marked fiber deflocculating potency. To obtain this derivative gum, hydrolysis of gum karaya should be controlled within the limits of deacetylation, and must not be permitted to proceed so far as to degenerate or impair the fundamental condensed molecular structure of the karaya gum. As measured by its potency to deflocculate, or maintain the dispersion of, water-suspended fibers, the deacetylated derivative from gum karaya appears to reach its optimum when approximately 25 per cent. of the acetyl radicals has been displaced. This potency appears to remain constant as deacetylation progresses beyond this point.

My discovery, therefore, may be succinctly, but fully, described as, (1) the method of making a deflocculating or dispersing agent as exemplified by the controlled and limited hydrolysis of gum karaya, or the deacetylation of gum karaya without substantial alteration or degeneration of the fundamental molecular structure of the said gum, (2) the product of this method, consisting of a deacetylated gum karaya, having its molecular structure otherwise substantially unaltered or undegenerated. The principal use of such deacetylated, otherwise unaltered, gum karaya, in my present contemplation, is in deflocculating fibers, as in paper making, characterized by the introduction into the water suspension of such fibers of the above designated deacetylated, otherwise unaltered, gum karaya, and the production of an article of manufacture consisting of a paper web and comprising the said deflocculant in association with its fibers, either as a stage product in paper making, or as a completed paper sheet, or both. In its aspect of a stage-product, the invention comprises also a suspension of papermaking fibers in water in which the said gum karaya derivative is dispersed and functions to deflocculate or maintain dispersion of fibers which otherwise would introduce flocks or mats of fibers in the paper itself and thus impair its formation. In respect to fiber deflocculation and paper-web formation, the said gum karaya derivative is believed to be especially useful when the fibers of which paper is to be made are much longer than those heretofore found amenable to paper making by mill-practice and machinery, although it manifests utility in forming paper from fibrous materials which respond to conventional means for securing good formation in a paper web.

The above-outlined improvement in paper making and paper is the subject of an application for Letters Patent of the United States, filed by me contemporaneously with this application, and serially numbered 714,457. A specific example of the manner in which the above-stated invention may be successfully practiced and realized in its several aspects, is as follows:

First, to make the deacetylated derivative of commercial gum karaya, take two parts by weight of the dry gum, and form a jelly thereof in 98 parts of water. The gum may advantageously be granulated for this purpose, but should not be subjected to excessive grinding, because it is susceptible to degeneration by mechanical attrition, and when thus broken down will not satisfactorily form the characteristic karaya jelly, which possesses very little cohesion, breaks short, and manifests no stringiness or tackiness.

On each 100 parts of this 2% karaya jelly, add 0.6 part of 26° Bé. aqueous ammonia, or add ammonia in the same ratio to the water to which karaya gum is added to form the jelly. The ammonia being well mixed with the water and dispersed gum, effects a gradual change in the jelly, usually in from 2 to 3 hours at room temperature, converting the gum jelly into a derived substance markedly different from karaya jelly in its physical characteristics, the derived gum jelly having pronounced cohesion, and being stringy, fibrous, or ropy in its structure. The conversion of gum karaya is accelerated if the alkalized dispersion is heated.

Gums, such as karaya, are complex, built up of diverse units, e. g., hexoses, pentoses, acid groups, alcoholic groups, and contain inorganic elements. Thus the partial hydrolysis of karaya gum involves the selective removal or substitution of certain segregable constituent groups and the derivation of a gum-like substance of which the chemical constitution of the molecules is, as measured by substitution or elimination of such selected groups, other than that of the molecules of the gum used as a source-material, and which has physical colloidal properties quite different from those of the source-material.

The chemical change produced by treatment of karaya gum with a mild alkali, preferably dilute ammonia as above stated, is deacetylation, with substitution of hydroxyl groups for acetyl groups. Titration shows that the amount of ammonia consumed is equivalent to the amount of ammonium acetate formed; thus it is shown that the chemical change is not due to formation of an ammonium salt of the gum acid, or to amination of the gum, but to deacetylation of the gum karaya. The controlled, selective hydrolysis of karaya by dilute ammonia is accompanied by no evidence of alteration of the complex molecular nucleus of the gum. The case is quite otherwise when karaya is treated with strong alkalies such as caustic soda, even at high dilutions strong alkalies progressively attack the gum nucleus, cause degeneration, and change the properties of the water-dispersion, which progressively loses viscosity and capacity for jelling, and changes in other respects. These changes can be detected by an alcohol precipitation test. If to a 2% dispersion of karaya in water an equal volume of ethyl alcohol be mixed, the gum comes down as a fine flocculent precipitate. Similar alcohol treatment of the karaya jelly which has been treated as above described with ammonia produces on the other hand a coherent, tough, fibrous or stringy precipitate. When alcohol is added to a karaya dispersion which has been treated with caustic until it has substantially lost its viscosity, little or no precipitation occurs. Thus the alcohol precipitation test shows the radical changes which can be produced by alkaline hydrolysis of karaya, and also serves to identify the deacetylated but undegenerated derivative of karaya produced by the partial hydrolysis by dilute ammonia Complete deacetylation of karaya is not necessary to the production of the derived gum-like substance, which as a product is one aspect of my invention. Removal of twenty-five per cent. of the acetyl groups produces substantially the same derivative, in respect to its physical characteristics, and particularly in respect to its potency as a deflocculant or dispersing agent for water-suspended paper fibers, as does complete deacetylation.

The susceptibility of gum karaya to degeneration by mechanical operations, e. g., extreme grinding, has been mentioned. Protracted vigorous agitation of a karaya dispersion or a water dispersion of the deacetylated karaya causes degeneration, as shown by the alcohol precipitation test, and the thus degenerated substances are unsatisfactory for the contemplated uses of this invention in proportion to the extent to which such degeneration has progressed.

There are other tests, applicable to a hydrolysis-derivative of karaya by which the desired physical colloidal properties of the derivative may be detected.

A fairly adequate rough qualitative test is by observing how long a thread or fiber of the gum derivative can be drawn between one's thumb and finger, previously dipped in a jelly made with the same.

A more accurate test is supplied by running a water-dispersion of the gum derivative (say 1% concentration) vertically through a capillary tube, 2 inches long and $\frac{1}{16}$ inch diameter, under a constant head of 30 inches, into a beaker held tipped so that the stream strikes the inside close to the lip, and then moving the beaker laterally. With the ammonia-deacetylated karaya, the lip of the beaker being about one inch below the capillary outlet, the stream can be deflected about half an inch, and still flow, in a catenary path, into the beaker. Dispersions of karaya, or of degenerated karaya derivatives cannot be thus deflected.

Fiber-deflocculation furnishes another practical test. Long fibers suspended in water are easily picked up by a stirring rod. A very small amount (e. g., one part in 10,000 parts of water) of deacetylated, undegenerated gum karaya, dispersed in the water makes it very difficult to pick up fibers with the stirring rod. Plain, untreated gum karaya has a little deflocculating effect, as thus tested, but so little as to be practically negligible.

If a dry deacetylated gum karaya is desired, it may be obtained by mixing granulated karaya with ethyl alcohol (in which the gum is insoluble, and which causes little if any swelling of the gum) and then treating the mixture with alcoholic ammonia, which deacetylates the gum, filtering, washing the gum with alcohol to remove ammonium acetate, and drying. This deacetylated karaya, when dispersed in water, yields dispersions or jellies having the same properties as the karaya derivative produced as above described by deacetylation in water with dilute ammonia. Deacetylation can also be effected by treating granulated karaya with ammonia vapor.

There is good evidence that the operation of the above-described deacetylated but undegenerated gum karaya is due mainly, if not wholly, to an emphatic polarity of the molecule of the gum derivative which the molecules of the original karaya do not possess. In many colloidal substances there may be observed the capacity to form strings or fibers, e. g., in dispersions of glue and other proteins, of which the molecules have acidic groups at one end and basic groups at the other, or such groups at more than a critical distance from each other on the molecule-chains. In the threads or fibers into which a thick glue solution can be drawn there are probably long chains of molecules with the carboxyl end of each molecule hanging to the amino end of the next in line. In the molecule of gum karaya there is a potentially active carboxyl, and hydroxyl groups which have been rendered inactive by association with acetyl groups, so that the molecules are only feebly polar if at all, and incapable of orienting themselves. After deacetylation of karaya, free and active hydroxyl groups are present and each molecule becomes emphatically polar, having positive hydroxyls and negative carboxyls, and orient themselves accordingly in the dispersion. This increase in effective molecular polarity is shown by the electrical conductivity of a dispersion of deacetylated karaya (washed to remove electrolytes) which is higher than that of karaya dispersions. This theory is supported by the observed behavior of deacetylated gum karaya in forming stringy or ropy precipitates with alcohol, wherein the oriented arrangement of strongly polar molecules in a dispersion persists. This behavior also shows a strongly probable reason why the substitution of one free hydroxyl for one of each four acetyls of gum karaya produces the same physical effects as complete deacetylation.

For controlled and partial hydrolysis (deacetylation) of gum karaya, instead of ammonia, other mild or buffered alkalies may be used, e. g., magnesia or borax. Amines, such as ethylene diamine or amyl amine, are competent agents for the purpose.

If great care be observed, caustic alkalies at very high dilution may be employed, but the danger of producing hydrolysis in excess of deacetylation, and to the point of degeneration of the molecular gum nucleus, is so great when using even very dilute caustics that they are not to be recommended.

The gum derivatives from karaya produced by partial to complete deacetylation thereof are quite dissimilar, particularly in their physical and colloidal properties, to natural acetyl-free gums, as for instance gum arabic, which contains no acetyl, or gum tragacanth, which has only a small acetyl content.

Exact specification of the proportion of ammonia, or other mild alkali, required for deacetylation of karaya, cannot be given, because this gum is far from uniform in composition, even as between karaya of the same market grade obtained from different importers, this doubtless because of slight variations in composition between gums taken from specifically different trees, which in mixture constitute the commercial karaya. With most karaya gum on the market, about 10% of commercial 26° Bé. ammonia on the weight of the gum will be found adequate, but each batch of gum should be checked by test.

1. Method of making a deflocculant of fibers dispersed in water, characterized by the step of treating gum karaya with a reactive proportion of a mild alkali thereby converting said gum karaya to deacetylate the same without otherwise altering its molecular structure.

2. Method of making a hydrophile paper-fiber deflocculant of fibers dispersed in water, characterized by subjecting gum karaya to the action of a mild alkali, thereby deacetylating the karaya without otherwise altering its molecular structure.

3. Method of making a deflocculant of fibers dispersed in water, characterized by the step of treating gum karaya with a reactive proportion of a mild alkali thereby to deacetylate the same without degenerating the polyose carbohydrate molecular structure of the gum karaya.

4. Method of making a deflocculant of fibers dispersed in water, characterized by subjecting gum karaya to the action of a mild alkali, thereby deacetylating the karaya without degeneration of its polyose carbohydrate molecular structure.

5. Method of making a water-dispersed fiber deflocculating derivative of gum karaya, characterized by the step of treating gum karaya with a reactive proportion of a mild alkali thereby to deacetylate the same and substitute hydroxyl therefor without destroying its water-imbibing characteristics.

6. Method of making a water-dispersed-fiber deflocculating derivative of gum karaya, characterized by subjecting gum karaya to the action of a mild alkali, thereby partially deacetylating the karaya without otherwise altering its molecular structure.

7. Method of making a water-dispersed-fiber deflocculating derivative of gum karaya, characterized by the step of treating gum karaya with a reactive proportion of a mild alkali thereby partially to deacetylate the same and substitute hydroxyl therefor, without otherwise altering its molecular structure.

8. Method of making a water-dispersed-fiber deflocculating derivative of gum karaya, characterized by subjecting gum karaya to the action of a mild alkali, thereby partially deacetylating the karaya without degeneration of its polyose carbohydrate molecular structure.

9. Method of making a water-dispersed-fiber deflocculating derivative of gum karaya, characterized by subjecting gum karaya to the action of ammonia, thereby partially deacetylating the karaya without otherwise altering its molecular structure.

10. Method of making a water-dispersed-fiber deflocculating derivative of gum karaya, characterized by subjecting gum karaya to the action of ammonia, thereby partially deacetylating the karaya without degeneration of its polyose carbohydrate molecular structure.

11. Deflocculant, applicable to water-dispersed paper-fibers, consisting of deacetylated, otherwise unaltered gum karaya.

12. Deflocculant, applicable to water-dispersed paper-fibers, consisting of the derivative of gum karaya produced by hydrolyzation of said gum by a mild alkali within the limits of deacetylation and without degeneration of the gum nucleus.

13. Deflocculant, applicable to water-dispersed paper-fibers, consisting of partly deacetylated, otherwise unaltered gum karaya.

14. Deflocculant, applicable to water-dispersed paper-fibers, consisting of a hydrophile gum derivative of a natural gum molecularly closely similar to gum karaya but differing therefrom by deacetylation to the extent of having not more than three of each four acetyl radicals constituent in gum karaya, and being otherwise unaltered.

15. Method of making a deflocculant of fibers dispersed in water, characterized by subjecting gum karaya to the action of a mild alkali, thereby removing at least one out of each four of the acetyl radicals constituent in gum karaya, without degenerating the molecular structure of the gum.

16. Method of treating natural hydrophile gums of the acetic acid ester type characterized by hydrolyzing the same with a mild alkali to replace the acetyl portion without otherwise altering the molecular structure.

17. Method of treating natural hydrophile gums of the acetic acid ester type characterized by hydrolyzing the same with an amine to replace the acetyl portion without otherwise altering the molecular structure.

18. Method of treating natural hydrophile gums of the acetic acid ester type characterized by hydrolyzing the same with ammonia to replace the acetyl portion without otherwise altering the molecular structure.

19. A gum deflocculant produced by the method of treating natural hydrophile gums of the acetic acid ester type characterized by hydrolyzing the same with a mild alkali to replace the acetyl portion without otherwise altering the molecular structure.

20. A gum deflocculant produced by the method of treating natural hydrophile gums of the acetic acid ester type characterized by hydrolyzing the same with an amine to replace the acetyl portion without otherwise altering the molecular structure.

21. A gum deflocculant produced by the method of treating natural hydrophile gums of the acetic acid ester type characterized by hydrolyzing the same with ammonia to replace the acetyl portion without otherwise altering the molecular structure.

THOMAS R. LE COMPTE.